(12) United States Patent
Miller

(10) Patent No.: US 12,607,133 B1
(45) Date of Patent: Apr. 21, 2026

(54) PROPULSIVE ENGINE HAVING A LUBRICANT SYSTEM DRIVEN BY COMPRESSED AIR

(71) Applicant: PRATT & WHITNEY CANADA CORP., Longueuil (CA)

(72) Inventor: Todd Miller, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 19/220,562

(22) Filed: May 28, 2025

(51) Int. Cl.
*F01D 25/18* (2006.01)
*F02C 7/06* (2006.01)
*F02C 6/08* (2006.01)

(52) U.S. Cl.
CPC ................ *F01D 25/18* (2013.01); *F02C 7/06* (2013.01); *F02C 6/08* (2013.01)

(58) Field of Classification Search
CPC .......... F01D 25/18; F01D 25/183; F02C 6/08; F02C 9/18
See application file for complete search history.

(56) References Cited

U.S. PATENT DOCUMENTS

| | | | |
|---|---|---|---|
| 2,874,540 A | 2/1959 | Esmeier et al. | |
| 3,032,986 A | 5/1962 | Wright | |
| 3,332,232 A | 7/1967 | Bevers | |
| 4,282,710 A | 8/1981 | Avant | |
| 6,058,694 A | 5/2000 | Ackerman et al. | |
| 10,815,887 B2 | 10/2020 | Lighty et al. | |
| 12,258,904 B2 | 3/2025 | Turnquist et al. | |
| 2009/0235630 A1* | 9/2009 | Norris ..................... F01D 25/20 60/39.08 |
| 2014/0003906 A1* | 1/2014 | Motto ..................... F01D 25/18 415/122.1 |
| 2018/0283210 A1* | 10/2018 | Cigal .................... F01D 11/003 |
| 2023/0349326 A1* | 11/2023 | Turnquist ................. F02C 6/08 |
| 2025/0305426 A1* | 10/2025 | Miller .................... F01D 25/20 |

FOREIGN PATENT DOCUMENTS

JP         3467553 B2      9/2003

* cited by examiner

*Primary Examiner* — Gerald L Sung

(74) *Attorney, Agent, or Firm* — NORTON ROSE FULBRIGHT CANADA LLP

(57) ABSTRACT

A propulsive engine, has: a core having a compressor section and a turbine section, the turbine section drivingly engaging the compressor section via a shaft, the compressor section having a bleed outlet for extracting compressed air at a bleed pressure; a support structure including an engine case surrounding the core, the support structure defining bearing cavities; bearings located inside the bearing cavities and disposed radially between the engine case and the shaft for rollingly supporting the shaft; and a lubricant tank having an inlet operatively connected to the bleed outlet of the compressor section and an outlet fluidly connected to the bearing cavities for lubricating the bearings, the bleed pressure being greater than a pressure inside the bearing cavities for inducing a lubricant flow from the lubricant tank to the bearing cavities.

18 Claims, 5 Drawing Sheets

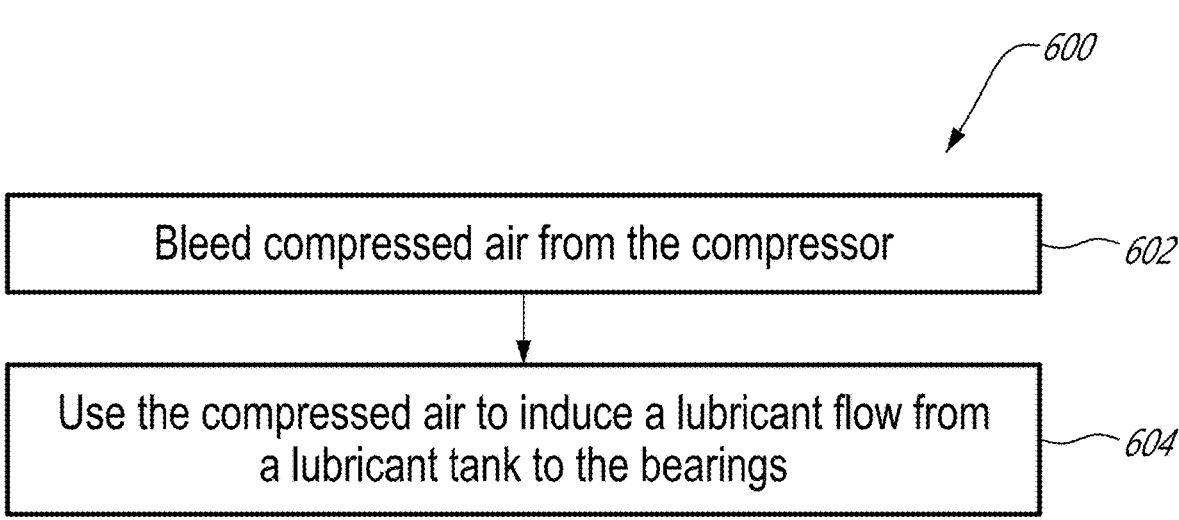

_600_

Bleed compressed air from the compressor _602_

Use the compressed air to induce a lubricant flow from a lubricant tank to the bearings _604_

FIG. 6

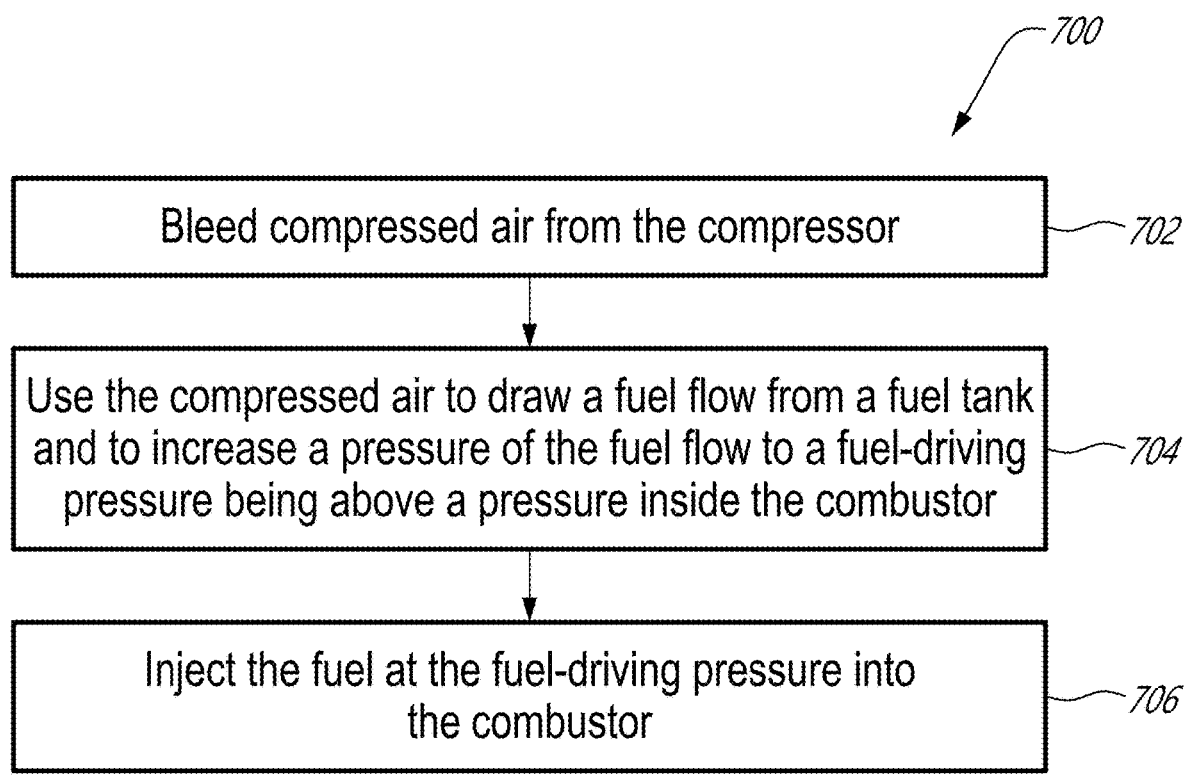

_700_

Bleed compressed air from the compressor _702_

Use the compressed air to draw a fuel flow from a fuel tank and to increase a pressure of the fuel flow to a fuel-driving pressure being above a pressure inside the combustor _704_

Inject the fuel at the fuel-driving pressure into the combustor _706_

FIG. 7

PROPULSIVE ENGINE HAVING A LUBRICANT SYSTEM DRIVEN BY COMPRESSED AIR

TECHNICAL FIELD

The disclosure relates generally to propulsive engines and, more particularly, to systems and methods used to provide lubricant and/or fuel to such engines.

BACKGROUND

Propulsive engines such as gas turbine engines have bearings to rollingly support shafts. These bearings need to be lubricated during use. Also, these engines have combustors that are supplied with a mixture of fuel and compressed air. This mixture is ignited to generate combustion gases. Typically, these engines are equipped with accessory gearboxes that drivingly engage pumps, such as lubricant pumps and fuel pumps, to induce flows of fuel and lubricant. Although existing systems are satisfactory, there remain a need for improvements.

SUMMARY

In one aspect, there is provided a propulsive engine, comprising: a core having a compressor section and a turbine section, the turbine section drivingly engaging the compressor section via a shaft, the compressor section having a bleed outlet for extracting compressed air at a bleed pressure; a support structure including an engine case surrounding the core, the support structure defining bearing cavities; bearings located inside the bearing cavities and disposed radially between the engine case and the shaft for rollingly supporting the shaft; and a lubricant tank having an inlet operatively connected to the bleed outlet of the compressor section and an outlet fluidly connected to the bearing cavities for lubricating the bearings, the bleed pressure being greater than a pressure inside the bearing cavities for inducing a lubricant flow from the lubricant tank to the bearing cavities.

The propulsive engine described above may include any of the following features, in any combinations.

In some embodiments, the propulsive engine includes a static pressure manifold having a manifold inlet fluidly connected to the bleed outlet and a manifold outlet fluidly connected to the inlet of the lubricant tank, the manifold inlet fluidly disconnected from the manifold outlet by a diaphragm being reversibly deformable, the bleed pressure of the compressed air transmitted to the lubricant tank via a deformation of the diaphragm.

In some embodiments, the lubricant tank includes two zones separated by a piston, the piston movable within the lubricant tank, a first zone of the two zones containing a fluid and being fluidly connected to the manifold outlet, a second zone of the two zones containing lubricant and being fluidly connected to the bearing cavities, wherein the compressed air at the bleed pressure exerts a force on the piston via the fluid and the diaphragm of the static pressure manifold to induce the lubricant flow.

In some embodiments, the fluid is the lubricant.

In some embodiments, the engine includes a pressure release valve having a valve inlet fluidly connected to the bleed outlet, a first valve outlet fluidly connected to the manifold inlet, and a second valve outlet in fluid communication with an environment outside the propulsive engine.

In some embodiments, the lubricant tank includes two zones separated by a piston, the piston movable within the lubricant tank, a first zone of the two zones containing air and being fluidly connected to the bleed outlet, a second zone of the two zones containing lubricant and being fluidly connected to the bearing cavities, wherein the compressed air at the bleed pressure exerts a force on the piston to induce the lubricant flow.

In some embodiments, the propulsive engine is devoid of a lubricant pump.

In some embodiments, a volume of the lubricant tank is selected to contain a quantity of lubricant sufficient for a duration of a mission of the propulsive engine.

In some embodiments, the propulsive engine is devoid of a lubricant scavenge system.

In some embodiments, the propulsive engine includes lubricant nozzles fluidly connected to the outlet of the lubricant tank, the lubricant nozzles fluidly connected to the bearing cavities.

In another aspect, there is provided a method for lubricating bearings of a propulsive engine having a turbine drivingly engaged to a compressor by a shaft, the shaft rollingly supported by the bearings, the method comprising: bleeding compressed air from the compressor; and using the compressed air to induce a lubricant flow from a lubricant tank to the bearings.

The method described above may include any of the following features, in any combinations.

In some embodiments, the using of the compressed air to induce the lubricant flow includes: using the compressed air to push on a piston of the lubricant tank; and inducing the lubricant flow out of the lubricant tank with the piston being pushed by the compressed air.

In some embodiments, the using of the compressed air to induce the lubricant flow includes: deforming a diaphragm of a static pressure manifold with the compressed air; and exerting a pressure on the lubricant in the lubricant tank using a deformation of the diaphragm caused by the compressed air.

In some embodiments, the exerting of the pressure on the lubricant using the deformation of the diaphragm includes: exerting pressure on a piston with a fluid of the static pressure manifold, the piston located inside the lubricant tank.

In some embodiments, the method includes: maintaining a substantially constant pressure at the static pressure manifold and below that of the compressed air by venting a portion of the compressed air to an environment outside the propulsive engine.

In some embodiments, the venting of the portion of the compressed air includes:
   venting the portion of the compressed air with a pressure regulating valve.

In some embodiments, the inducing of the lubricant flow includes inducing the lubricant flow solely via the compressed air and without a lubricant pump.

In some embodiments, the inducing of the lubricant flow from the lubricant tank includes: inducing the lubricant flow from the lubricant tank having a volume selected to contain a quantity of lubricant sufficient for a duration of a mission of the propulsive engine.

In some embodiments, the method includes injecting the lubricant flow to the bearings via nozzles.

In yet another aspect, there is provided a propulsive engine, comprising: a core having a turbine section drivingly engaged with a compressor section via a shaft; a support structure including an engine case surrounding the core, the support structure defining bearing cavities; bearings located inside the bearing cavities and disposed radially between the engine case and the shaft for rollingly supporting the shaft; a lubricant tank fluidly connected to the bearing cavities for lubricating the bearings; and a compressor bleed air system operatively connected to the lubricant tank for inducing a lubricant flow from the lubricant tank to the bearing cavities.

DESCRIPTION OF THE DRAWINGS

Reference is now made to the accompanying figures in which:

FIG. 6 is a flowchart illustrating steps of a method of lubricating the gas turbine engine of FIG. 1;

FIG. 7 is a flowchart illustrating steps of a method of supplying fuel to the gas turbine engine of FIG. 1.

DETAILED DESCRIPTION

Figure 1:
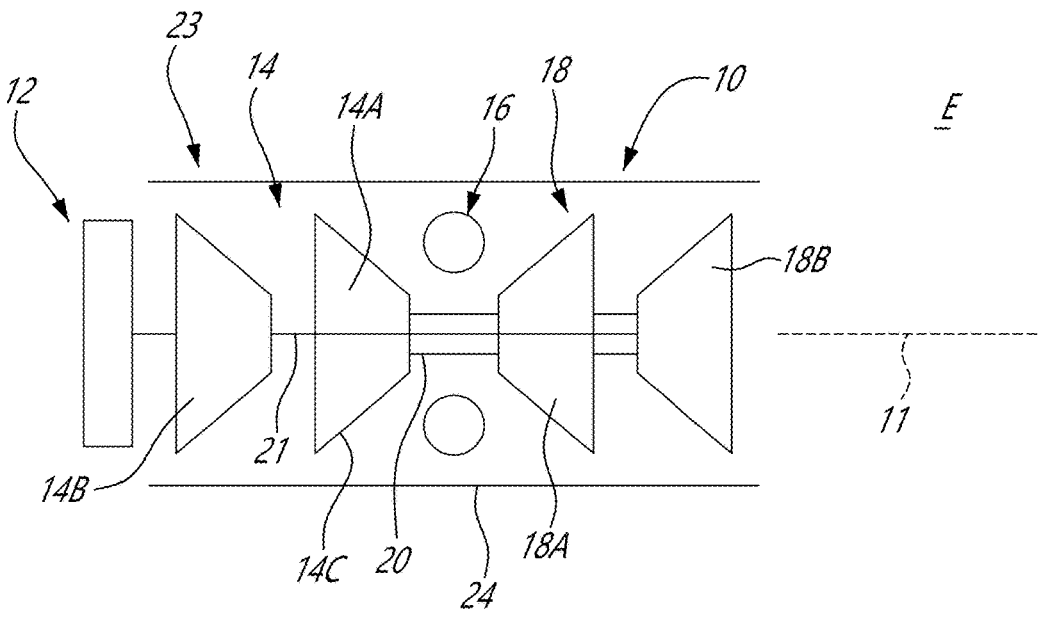
FIG. 1 is a schematic cross-sectional view of a propulsive engine depicted as a gas turbine engine.

FIG. 1 illustrates a propulsive engine depicted as a gas turbine engine 10 of a type preferably provided for use in subsonic flight, generally comprising in serial flow communication a fan 12 through which ambient air is propelled a compressor section 14 for pressurizing the air, a combustor 16 in which the compressed air is mixed with fuel and ignited for generating an annular stream of hot combustion gases, and a turbine section 18 for extracting energy from the combustion gases. The compressor section 14, the combustor 16, and the turbine section 18 are part of a core of the gas turbine engine 10. The fan 12, the compressor section 14, and the turbine section 18 are rotatable about a central axis 11 of the gas turbine engine 10. In the embodiment shown, the gas turbine engine 10 comprises a high-pressure spool having a high-pressure shaft 20 drivingly engaging a high-pressure turbine 18A of the turbine section 18 to a high-pressure compressor 14A of the compressor section 14, and a low-pressure spool having a low-pressure shaft 21 drivingly engaging a low-pressure turbine 18B of the turbine section 18 to a low-pressure compressor 14B of the compressor section 14 and drivingly engaged to the fan 12.

The compressor section 14 has a bleed outlet 14C that is in fluid communication with one or more stages of the compressor, such as a stage of the high-pressure compressor 14A. The bleed outlet 14C may includes a number of bleed off valves (BOV) configured to bleed compressed air from the high pressure compressor 14A. The pressure of the compressed air exiting the high-pressure compressor 14A via the bleed outlet 14C may be at a bleed pressure that is higher than a pressure in an environment E in which the propulsive engine is being operated and that is also lower than a pressure inside the combustor 16 is since a pressure of the air discharged by the high-pressure compressor 14A is greater than the pressure of the bleed outlet 14C.

As shown in FIG. 1, the gas turbine engine 10 includes a support structure 23 including an engine case 24 that surrounds the core and that extends around the central axis 11.

Figure 3:
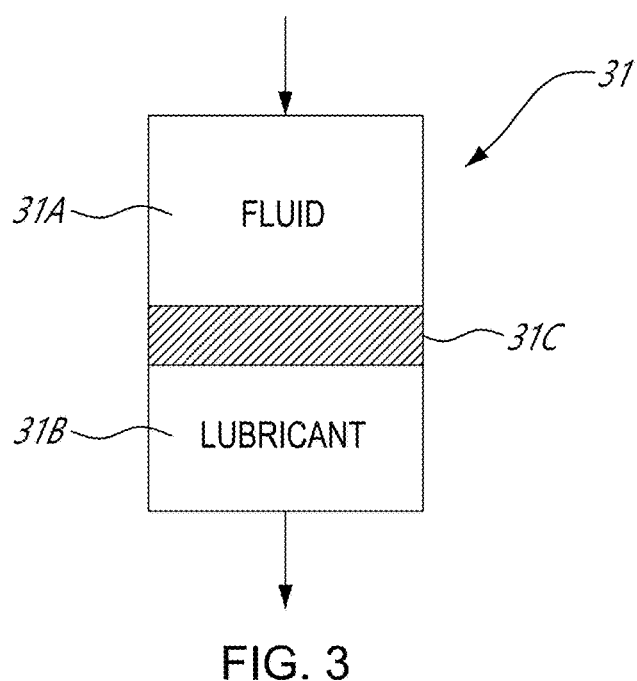
FIG. 3 is a cross-sectional view of a lubricant tank of the lubricant system of FIG. 2.

As shown in FIG. 3, the support structure 23 further defines bearing cavities 25 that each contain one or more bearings 26. The bearings 26 are disposed radially between the support case 24 and the shaft (e.g., high-pressure shaft 20, low-pressure shaft 21) for rollingly supporting the shaft.

Figure 2:
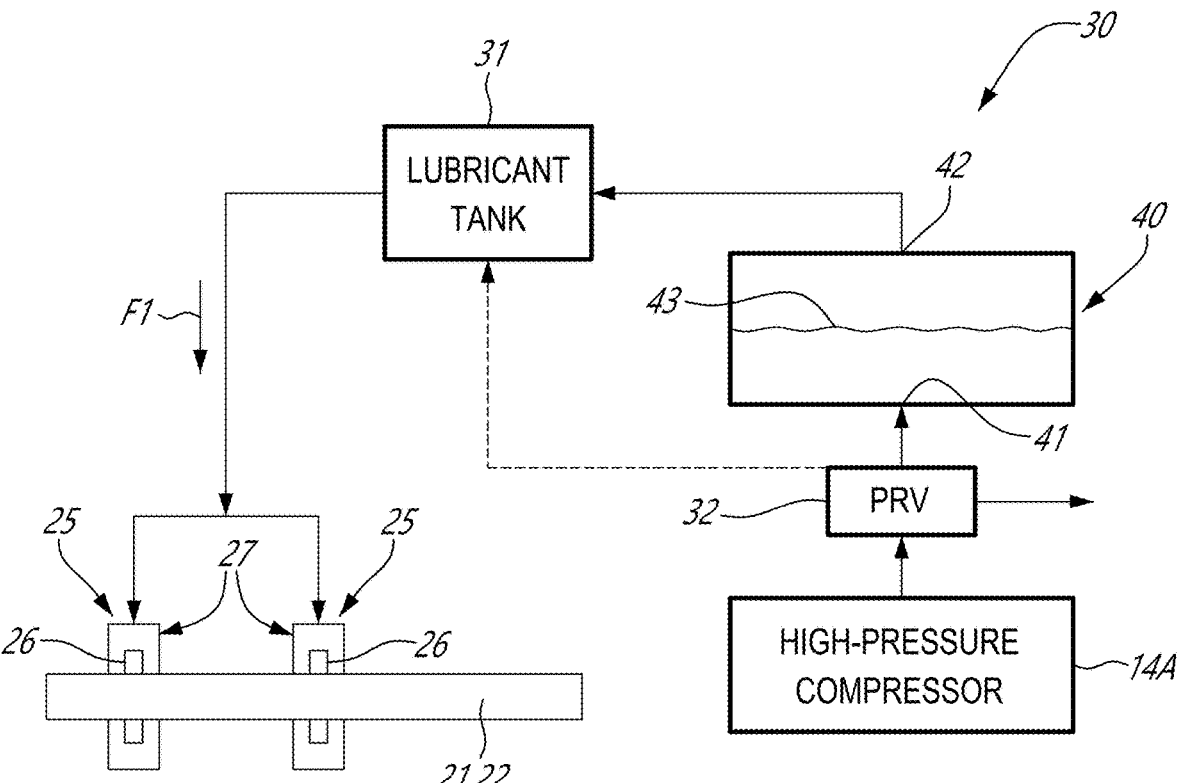
FIG. 2 is a schematic view of a lubricant system of the gas turbine engine of FIG. 1.

Still referring to FIG. 2, the gas turbine engine 10 includes a lubricant system 30 for supplying lubricant to the different components in need of lubrication such as the bearings 26. The lubricant system 30 includes a lubricant tank 31 having an inlet operatively connected to the bleed outlet 14C and an outlet fluidly connected to the bearing cavities 25 for lubricating the bearings 26. As illustrated in FIG. 1, the gas turbine engine 10 is devoid of any pumps and is also devoid of any gearbox (e.g., accessory gearbox). Having the gas turbine engine 10 devoid of any accessory gearbox and devoid of pumps such as a lubricant pump and a scavenge pump allows to keep a weight of the gas turbine engine 10 as minimal as possible. However, gas turbine engines typically rely on accessory gearboxes that drive pumps to induce a flow of lubricant from a source of lubricant to the different components in need of lubrication. In the present embodiment, the gas turbine engine 10 uses another mean to ensure a lubricant flow from the source of lubricant to the different components. The inventors of the present disclosure have found that it is possible to use the compressed air bled from the compressor section 14 (e.g., from the high-pressure compressor 14A) to induce the flow of lubricant to the bearings cavities 25.

In the embodiment shown, the compressed air being bled from the high-pressure compressor 14A is greater than a pressure inside the bearing cavities 25 and may therefore be used for inducing a lubricant flow F1 from the lubricant tank 31 to the bearing cavities 25. As illustrated, lubricant nozzles 27 are fluidly connected to the outlet of the lubricant tank 31 and are fluidly connected to the bearing cavities 25.

In some embodiments, the compressed air is used to exert a pressure on the lubricant contained in the lubricant tank 31. To ensure a substantially constant pressure, the compressed air may flow through a pressure release valve 32. The pressure release valve 32 may have a valve inlet fluidly connected to the bleed outlet 14C, a first valve outlet operatively connected to the lubricant tank 31, and a second valve outlet in fluid communication with the environment E outside the propulsive engine for expelling the compressed air. In use, the pressure release valve 32 allows a portion of the compressed air to flow to the first valve outlet and a remainder of the compressed air is directed to the environment E to maintain a substantially constant pressure at the inlet of the lubricant tank 31.

In some embodiments, the compressed air may be directly injected in the lubricant tank 31 to increase a pressure inside the lubricant tank 31. This is represented with a dashed line in FIG. 2. This pressure may cause the lubricant to exit the lubricant tank 31 to flow towards the bearing cavities 25 to lubricant the bearings 26. Alternatively, and as shown in FIG. 3, the lubricant tank 31 includes two zones 31A, 31B separated by a piston 31C. The piston 31C is movable within the lubricant tank 31 and may sealingly engage a peripheral wall of the lubricant tank 31. A first zone 31A of the two zones 31A, 31B receives a fluid and a second zone 31B of the two zones contains the lubricant. The fluid therefore exerts a pressure force against the piston 31C to increase a volume of the first zone 31A to consequently decrease a volume of the second zone 31B to push the lubricant out towards the bearing cavities 25. The fluid may be the compressed air bled from the compressor section 14. As will be discussed below, another fluid may be received in the first zone 31A to create the pushing action.

Referring back to FIG. 2, in the embodiment shown, the lubricant system 30 includes a static pressure manifold 40 that is used to transfer the pressure of the compressed air bled from the high-pressure compressor 14A to another fluid. This other fluid may be a lubricant or any other fluid, such as a liquid (e.g., hydraulic fluid). In fact, it has been observed by the inventor(s) of the present disclosure that, in some conditions, the temperature of the compressed air bled from the high pressure compressor 14A maybe too high for the lubricant contained in the lubricant tank 31. Therefore, to mitigate this phenomenon, the lubricant system 30 uses the static pressure manifold 40 as a mean for transferring the pressure of the compressed air to another fluid instead of using directly the air of the high-pressure compressor 14A for pressurizing the lubricant tank 31. However, it will be appreciated that, in some embodiments, a heat exchanger may be used to decrease the temperature of the compressed air enough to be used to directly push on the lubricant. However, the present gas turbine engine 10 may be devoid of heat exchanger.

The static pressure manifold 40 has a manifold inlet 41 fluidly connected to the bleed outlet 14C and a manifold outlet 42 fluidly connected to the inlet of the lubricant tank 31. In this configuration, the first valve outlet of the pressure release valve 32 is fluidly connected to the manifold inlet 41. The manifold inlet 41 is fluidly disconnected from the manifold outlet 42 by a diaphragm 43 being reversibly deformable. The diaphragm 43 may include a plate defining corrugations to allow the diaphragm 43 to deform via the pressure exerted on it by the air bled from the high pressure compressor 14A. Any suitable static pressure manifold maybe used without departing from the scope of the present disclosure. Therefore, in this embodiment, the bleed pressure of the compressed air is transmitted to the lubricant tank 31 via a deformation of the diaphragm 43. Using the static pressure manifold 40 allows the pressure of the compressed air to be transmitted to the lubricant tank 31 indirectly and may protect the lubricant from the hot compressed air bled from the high-pressure compressor 14A. In other words, when the diaphragm 43 of the static pressure manifold 40 is exposed to the pressure of the compressed air bled from the high-pressure compressor 14A, the diaphragm 43 deforms and pushes on the fluid located above the diaphragm 43. The fluid therefore generates the pressure that is transmitted to the lubricant tank 31 and this pressure is used to push the lubricant out of the lubricant tank 31 using the piston 31C to feed the bearing cavities 25 with the lubricant. The fluid that feeds the lubricant tank 31 may be non-compressible (e.g., liquid), or it may be compressible (e.g., air).

Referring jointly to FIGS. 2-3, it can be appreciated, the second zone 31A of the lubricant tank 31 is fluidly connected with the manifold outlet 42 of the static pressure manifold 40. The compressed air at the bleed pressure thus exerts a force on the piston 31C via the fluid and via the diaphragm 43 of the static pressure manifold 40 to induce the lubricant flow.

In this configuration, a volume of the lubricant tank 31 is selected to contain a quantity of lubricant sufficient for a duration of a mission of the gas turbine engine 10. Consequently, the gas turbine engine 10 may be devoid of a lubricant scavenge system. This may imply that the lubricant that is fed to the bearing cavities 26 to lubricate the bearing 25 may be burned during operation of the gas turbine engine 10. The configuration of the lubricant system 30 discussed above may allow the gas turbine engine 10 to be adequately lubricated by using compressed air and not relying on complex pumps and gearboxes. A weight of the gas turbine engine 10 may thus be minimized, which may increase performance throughout its mission. Moreover, the omission of gearbox(es), pump(s), and so on may keep a cross-sectional area of the gas turbine engine 10 as minimal as possible, thereby reducing drag during flight.

Figure 4:
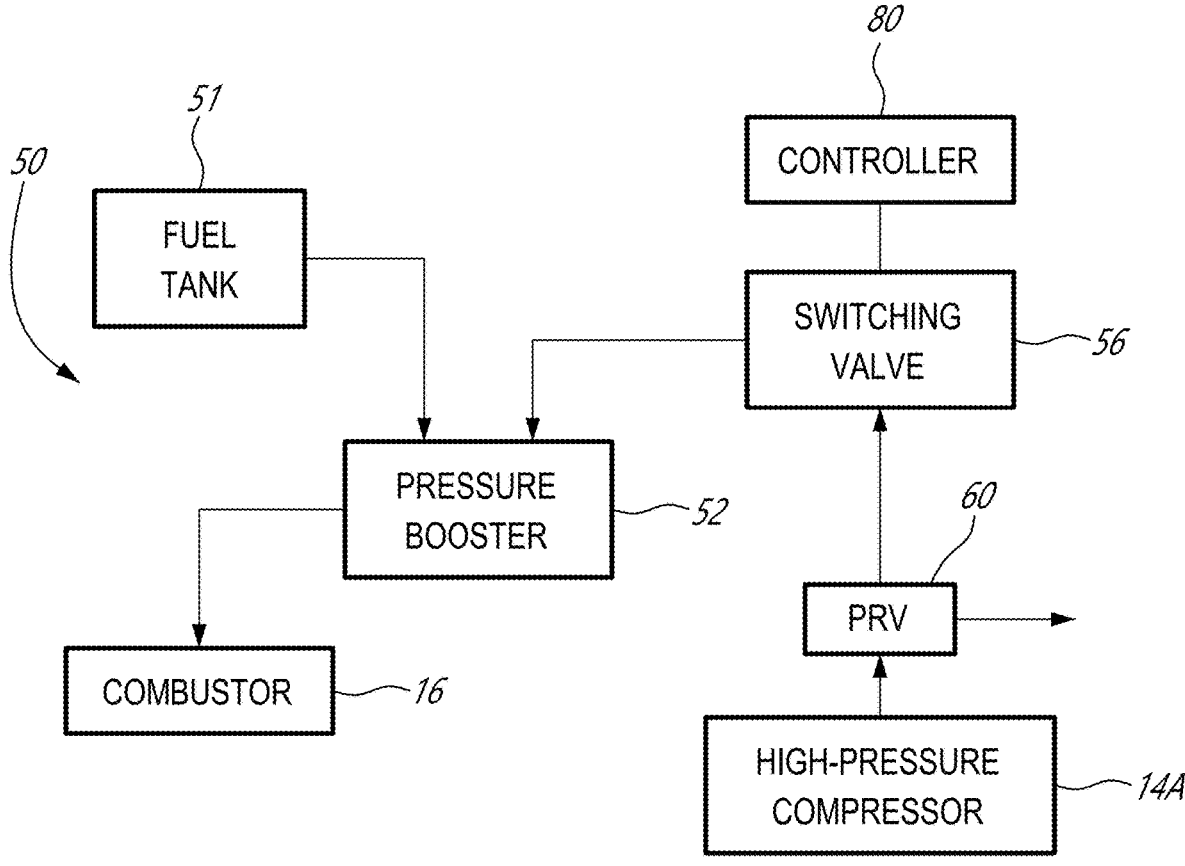
FIG. 4 is a schematic view of a fuel system for the gas turbine engine of FIG. 1.
Figure 5:
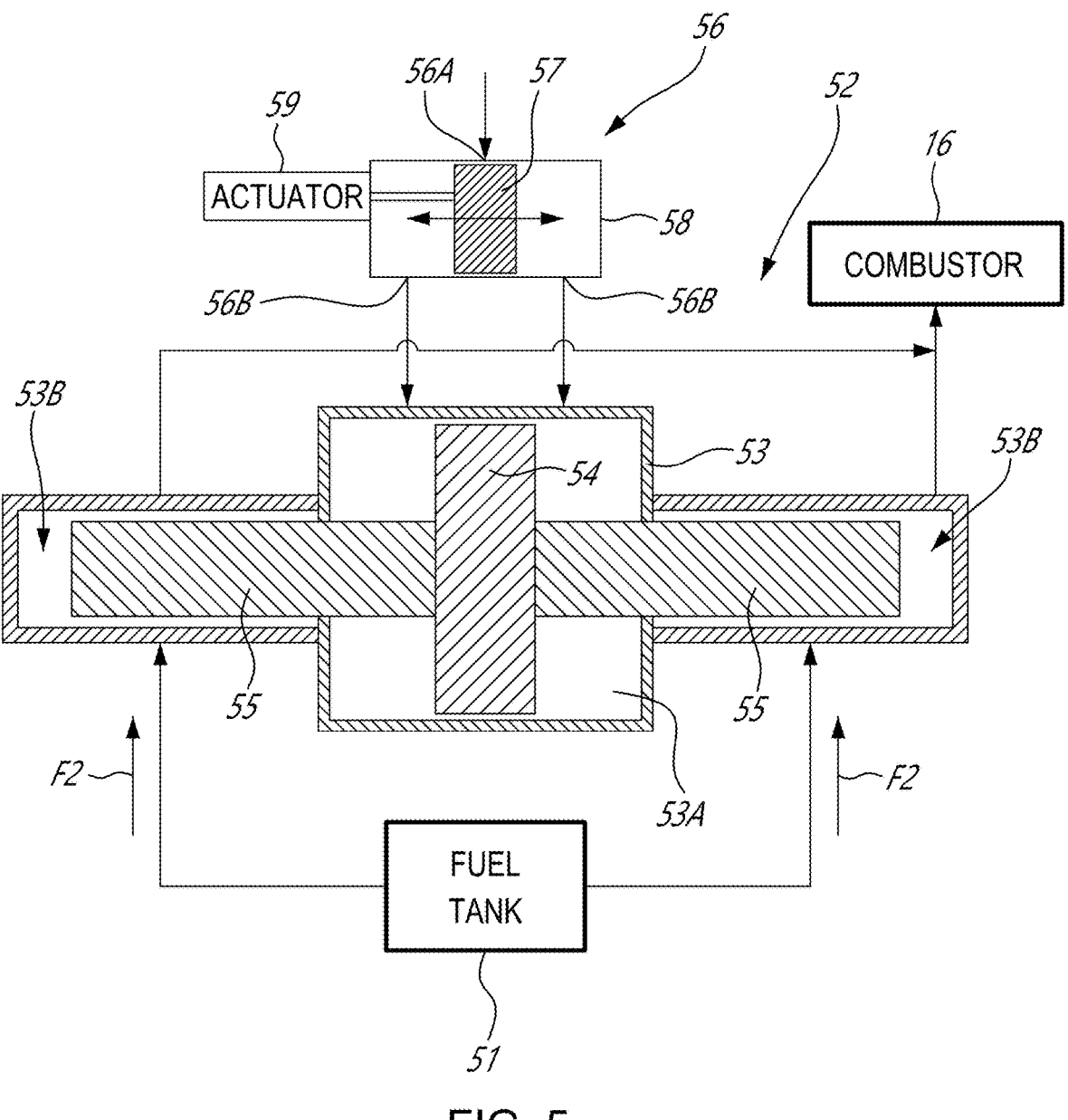
FIG. 5 is a cross-sectional view of a pressure booster of the fuel system of FIG. 4.

Referring now to FIGS. 4-5, a fuel system of the propulsive engine of FIG. 1 is shown at 50. The fuel system 50 includes a fuel tank 51 fluidly connected to the combustor 16. The fuel system 50 is configured to use the air bled from the compressed section 14 for inducing a fuel flow from the fuel tank 51 to the combustor 16. As both of the fuel system 50 and the lubricant system 30 use compressed air, the compressor section 14 may be provided with more than one bleed outlet. Alternatively, a manifold may be connected to the bleed outlet 14C to distribute the compressed air between the fuel and lubricant systems.

As aforementioned, the compressed air bled from the compressor section 14 may be at a pressure lower than a pressure inside the combustor 16. Therefore, it may be required to increase the pressure of the fuel in order to induce a fuel flow from the fuel tank 51 to the combustor 16. Thus, in the embodiment shown, the fuel system 50 further includes a pressure booster 52 that is configured to increase a pressure of the fuel above a pressure inside the combustor 16 using the compressed air at the bleed pressure.

Referring to FIG. 5, in the embodiment shown, the pressure booster 52 includes a housing 53 defining an air chamber 53A fluidly connected to the bleed outlet 14C of the compressor section 14 and two fuel chambers 53B each fluidly connected to the fuel tank 51 and to the combustor 16. A pneumatic piston 54 is reciprocally movably received in the air chamber 53A. Hydraulic pistons 55 are each reciprocally movably received within a respective one of the two fuel chambers 53B and are drivingly engaged by the pneumatic piston 54. The hydraulic pistons 55 have a cross-sectional area taken on a plane normal to a direction of movement of the hydraulic pistons 55 smaller than that of the pneumatic piston 54. The difference in cross-sectional areas is used to increase the pressure of the fuel above that of the compressed air. In the present embodiment, reciprocating motions of the pneumatic piston 54 are causing reciprocating motions of the hydraulic pistons 55 to draw a fuel flow F2 from the fuel tank 51 and to inject the fuel flow F2 to the combustor 16. In this configuration, the two hydraulic pistons 55 protrude each from a respective side of the pneumatic piston 54.

Still referring to FIG. 5, the fuel system 50 includes a switching valve 56 having a valve inlet 56A fluidly connected to the bleed outlet 14C of the compressor section 14 and two valve outlets 56B each fluidly connected to the air chamber 53A on a respective one of opposite sides of the pneumatic piston 54. As shown in FIG. 4, the operation of the fuel system 50 may be controlled by a controller 80 operatively connected to the switching valve 56. The switching valve 56 alternately connects the valve inlet 56A with each of the two valve outlets 56B in a reciprocating cycle to induce the reciprocating motions of the pneumatic piston 54. Put differently, in operation, the switching valve 56 allows the compressed air to flow on one side of the pneumatic piston 54 therefore pushing the pneumatic piston in one direction. Then, the switching valve 56 allows the compressed air to flow to the other side of the pneumatic piston 54 to push the pneumatic piston in the opposite direction. This creates the reciprocating motion of the pneumatic piston 54 and of the hydraulic pistons 55, which, in this embodiment, are directly secured to the pneumatic piston 54. In some embodiments, the switching valve 56 has a valve member 57 movably received within a valve housing 58. The valve member 57 may be engaged by an actuator 59 such as a solenoid (e.g., switching solenoid) or any suitable actuator. It will be appreciated that the fuel system 50 may include any number of other components such as check valves to ensure that the direction of the flow of compressed air and of the fuel is appropriate.

As illustrated in FIG. 4, a pressure release valve 60 having a valve inlet fluidly connected to the bleed outlet 14C, a first valve outlet fluidly connected to the pressure booster 52, and a second valve outlet in fluid communication with the environment E outside the gas turbine engine 10 may be used. This pressure release valve 60 may ensure that the pressure of the compressed air reaching the pressure booster 52 is substantially constant.

As described above the fuel system 50 is devoid of a fuel pump. The only mechanism used to induce the fuel flow is the pressure booster 52 driven by compressed air as described above. As already mentioned, the gas turbine engine 10 may be devoid of an accessory gearbox and therefore it may not be possible to use mechanical power produced by the shaft of the gas turbine engine 10 to drive a pump that would induce fuel flow and/or the lubricant flow. Put differently, the pressure booster 52 is mechanically disengaged from the core of the a gas turbine engine 10.

Referring now to FIG. 6, a method for lubricating the bearings 26 is shown at 600. The method 600 includes bleeding compressed air from the compressor at 602; and using the compressed air to induce the lubricant flow F1 from the lubricant tank 31 to the bearings 26.

In some embodiments, the using of the compressed air to induce the lubricant flow at 604 may include: using the compressed air to push on the piston 31C of the lubricant tank 31; and inducing the lubricant flow F1 out of the lubricant tank 31 with the piston 31C being pushed by the compressed air.

In some embodiments, the using of the compressed air to induce the lubricant flow F1 at 604 may include: deforming the diaphragm 43 of the static pressure manifold 40 with the compressed air; and exerting a pressure on the lubricant in the lubricant tank 31 using the deformation of the diaphragm 43 caused by the compressed air. In some embodiments, the exerting of the pressure on the lubricant using the deformation of the diaphragm 43 may include: exerting pressure on the piston 31C with a fluid of the static pressure manifold 40.

In some embodiments, the method 600 includes maintaining a substantially constant pressure at the static pressure manifold 40 and below that of the compressed air by venting a portion of the compressed air to the environment E outside the propulsive engine. As explained above, this may be done using the pressure release valve 32.

As discussed above, in the context of the present disclosure, the inducing of the lubricant flow F1 includes inducing the lubricant flow F1 solely via the compressed air and without a lubricant pump.

Referring now to FIG. 7, a method for supplying fuel to the combustor 16 of the gas turbine engine 10 is shown at 700. The method 700 includes bleeding compressed air from the compressor section 14 at 702; using the compressed air to draw the fuel flow F2 from the fuel tank 51 and to increase the pressure of the fuel flow F2 to a fuel-driving pressure being above the pressure inside the combustor 16 at 704; and injecting the fuel at the fuel-driving pressure into the combustor 16 at 706.

In some embodiments, the using of the compressed air to increase the pressure of the fuel flow F2 includes using the compressed air to induce reciprocating motion of the pneumatic piston 54; and reciprocally moving the hydraulic pistons 55 with the pneumatic piston 54. As discussed above, the hydraulic pistons 55 have a cross-sectional area taken on the plane normal to the direction of movement of the hydraulic pistons 55 being less than that of the pneumatic piston 54. As shown in FIG. 5, the using of the compressed air to induce the reciprocating motion of the pneumatic piston 54 includes alternately connecting the compressor section 14 to each of the two sub-chambers in a reciprocating cycle to induce reciprocating motions of the pneumatic piston 54. The alternately connecting of the compressor section 14 to each of the two sub-chambers includes alternately configuring the switching valve 56 in the respective one of the first configuration in which the switching valve 56 fluidly connects the compressor section 14 to one of the two sub-chambers and the second configuration in which the switching valve 56 fluidly connects the compressor section 14 to the other of the two sub-chambers.

Figure 8:
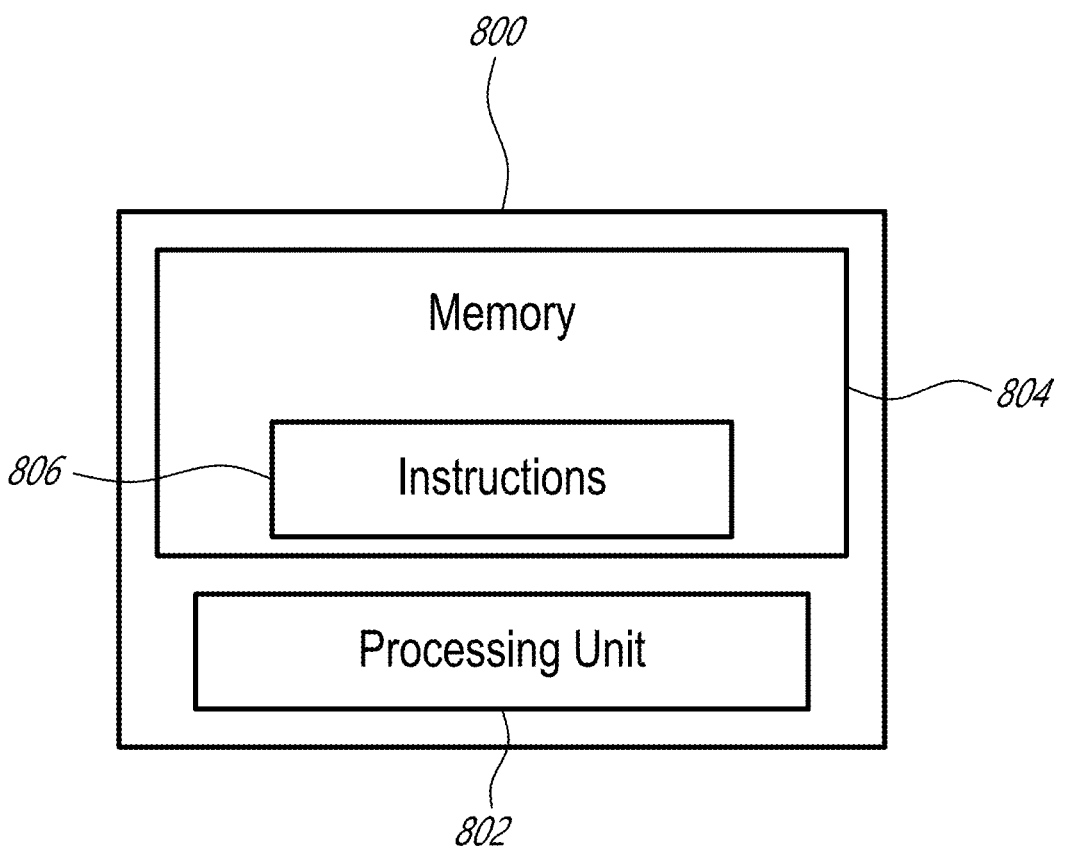
FIG. 8 is a schematic representation of a controller.

With reference to FIG. 8, an example of a computing device 800 is illustrated. For simplicity only one computing device 800 is shown but the system may include more computing devices 800 operable to exchange data. The computing devices 800 may be the same or different types of devices. The controller 80 may be implemented with one or more computing devices 800. Note that the controller 80 can be implemented as part of a full-authority digital engine controls (FADEC) or other similar device, including electronic engine control (EEC), engine control unit (ECU), electronic propeller control, propeller control unit, and the like. In some embodiments, the controller 80 is implemented as a Flight Data Acquisition Storage and Transmission system, such as a FAST™ system. The controller 80 may be implemented in part in the FAST™ system and in part in the EEC. Other embodiments may also apply.

The computing device 800 comprises a processing unit 802 and a memory 804 which has stored therein computer-executable instructions 806. The processing unit 802 may comprise any suitable devices configured to implement the method described herein such that instructions 806, when executed by the computing device 800 or other programmable apparatus, may cause the functions/acts/steps performed as part of the method as described herein to be executed. The processing unit 802 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 804 may comprise any suitable known or other machine-readable storage medium. The memory 804 may comprise non-transitory computer readable storage medium, for example, but not limited to, an electronic, magnetic, optical, electromagnetic, infrared, or semiconductor system, apparatus, or device, or any suitable combination of the foregoing. The memory 804 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 804 may comprise any storage means (e.g., devices) suitable for retrievably storing machine-readable instructions 806 executable by processing unit 802.

The methods and systems described herein may be implemented in a high level procedural or object oriented programming or scripting language, or a combination thereof, to communicate with or assist in the operation of a computer system, for example the computing device 800. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or more specifically the processing unit 802 of the computing device 800, to operate in a specific and pre-defined manner to perform the functions described herein, for example those described in the method described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. For instance, while the various aspect of the instant disclosure have been described in the context of a turbofan engine, it is understood that they could be applied to other types of propulsive engines and airborne powerplants. Yet further modifications could be implemented by a person of ordinary skill in the art in view of the present disclosure, which modifications would be within the scope of the present technology.

The invention claimed is:

1. A propulsive engine, comprising:
a core having a turbine section drivingly engaged with a compressor section via a shaft;
a support structure including an engine case surrounding the core, the support structure defining bearing cavities;
bearings located inside the bearing cavities and disposed radially between the engine case and the shaft for rollingly supporting the shaft;
a lubricant tank fluidly connected to the bearing cavities for lubricating the bearings; and
a compressor bleed air system operatively connected to the lubricant tank for inducing a lubricant flow from the lubricant tank to the bearing cavities,
wherein the propulsive engine is devoid of a lubricant pump.

2. The propulsive engine of claim 1, further comprising a static pressure manifold having a manifold inlet fluidly connected to the bleed outlet and a manifold outlet fluidly connected to the inlet of the lubricant tank, the manifold inlet fluidly disconnected from the manifold outlet by a diaphragm being reversibly deformable, the bleed pressure of the compressed air transmitted to the lubricant tank via a deformation of the diaphragm.

3. The propulsive engine of claim 2, wherein the lubricant tank includes two zones separated by a piston, the piston movable within the lubricant tank, a first zone of the two zones containing a fluid and being fluidly connected to the manifold outlet, a second zone of the two zones containing lubricant and being fluidly connected to the bearing cavities, wherein the compressed air at the bleed pressure exerts a force on the piston via the fluid and the diaphragm of the static pressure manifold to induce the lubricant flow.

4. The propulsive engine of claim 3, wherein the fluid is the lubricant.

5. The propulsive engine of claim 2, further comprising a pressure release valve having a valve inlet fluidly connected to the bleed outlet, a first valve outlet fluidly connected to the manifold inlet, and a second valve outlet in fluid communication with an environment outside the propulsive engine.

6. The propulsive engine of claim 1, wherein the lubricant tank includes two zones separated by a piston, the piston movable within the lubricant tank, a first zone of the two zones containing air and being fluidly connected to the bleed outlet, a second zone of the two zones containing lubricant and being fluidly connected to the bearing cavities, wherein the compressed air at the bleed pressure exerts a force on the piston to induce the lubricant flow.

7. The propulsive engine of claim 1, wherein a volume of the lubricant tank is selected to contain a quantity of lubricant sufficient for a duration of a mission of the propulsive engine.

8. The propulsive engine of claim 1, wherein the propulsive engine is devoid of a lubricant scavenge system.

9. The propulsive engine of claim 1, comprising lubricant nozzles fluidly connected to the outlet of the lubricant tank, the lubricant nozzles fluidly connected to the bearing cavities.

10. A propulsive engine, comprising:
a core having a compressor section and a turbine section, the turbine section drivingly engaging the compressor section via a shaft, the compressor section having a bleed outlet for extracting compressed air at a bleed pressure;
a support structure including an engine case surrounding the core, the support structure defining bearing cavities;
bearings located inside the bearing cavities and disposed radially between the engine case and the shaft for rollingly supporting the shaft;
a lubricant tank having an inlet operatively connected to the bleed outlet of the compressor section and an outlet fluidly connected to the bearing cavities for lubricating the bearings, the bleed pressure being greater than a pressure inside the bearing cavities for inducing a lubricant flow from the lubricant tank to the bearing cavities; and
a static pressure manifold ng a ma id idly connected to the bleed outlet and a manifold outlet fluidly connected to the inlet of the lubricant tank, the manifold inlet fluidly disconnected from the manifold outlet by a diaphragm being reversibly deformable, the bleed pressure of the compressed air transmitted to the lubricant tank via a deformation of the diaphragm.

11. The propulsive engine of claim 1, wherein the lubricant tank includes two zones separated by a piston, the piston movable within the lubricant tank, a first zone of the two zones containing a fluid and being fluidly connected to the manifold outlet, a second zone of the two zones containing lubricant and being fluidly connected to the bearing cavities, wherein the compressed air at the bleed pressure exerts a force on the piston via the fluid and the diaphragm of the static pressure manifold to induce the lubricant flow.

12. The propulsive engine of claim 11, wherein the fluid is the lubricant.

13. The propulsive engine of claim 1, further comprising a pressure release valve having a valve inlet fluidly connected to the bleed outlet, a first valve outlet fluidly connected to the manifold inlet, and a second valve outlet in fluid communication with an environment outside the propulsive engine.

14. The propulsive engine of claim 1, wherein the lubricant tank includes two zones separated by a piston, the piston movable within the lubricant tank, a first zone of the two zones containing air and being fluidly connected to the bleed outlet, a second zone of the two zones containing lubricant and being fluidly connected to the bearing cavities, wherein the compressed air at the bleed pressure exerts a force on the piston to induce the lubricant flow.

15. The propulsive engine of claim 1, wherein the propulsive engine is devoid of a lubricant pump.

16. The propulsive engine of claim 1, wherein a volume of the lubricant tank is selected to contain a quantity of lubricant sufficient for a duration of a mission of the propulsive engine.

17. The propulsive engine of claim 1, wherein the propulsive engine is devoid of a lubricant scavenge system.

18. The propulsive engine of claim 1, comprising lubricant nozzles fluidly connected to the outlet of the lubricant tank, the lubricant nozzles fluidly connected to the bearing cavities.

\* \* \* \* \*